Patented Sept. 8, 1942

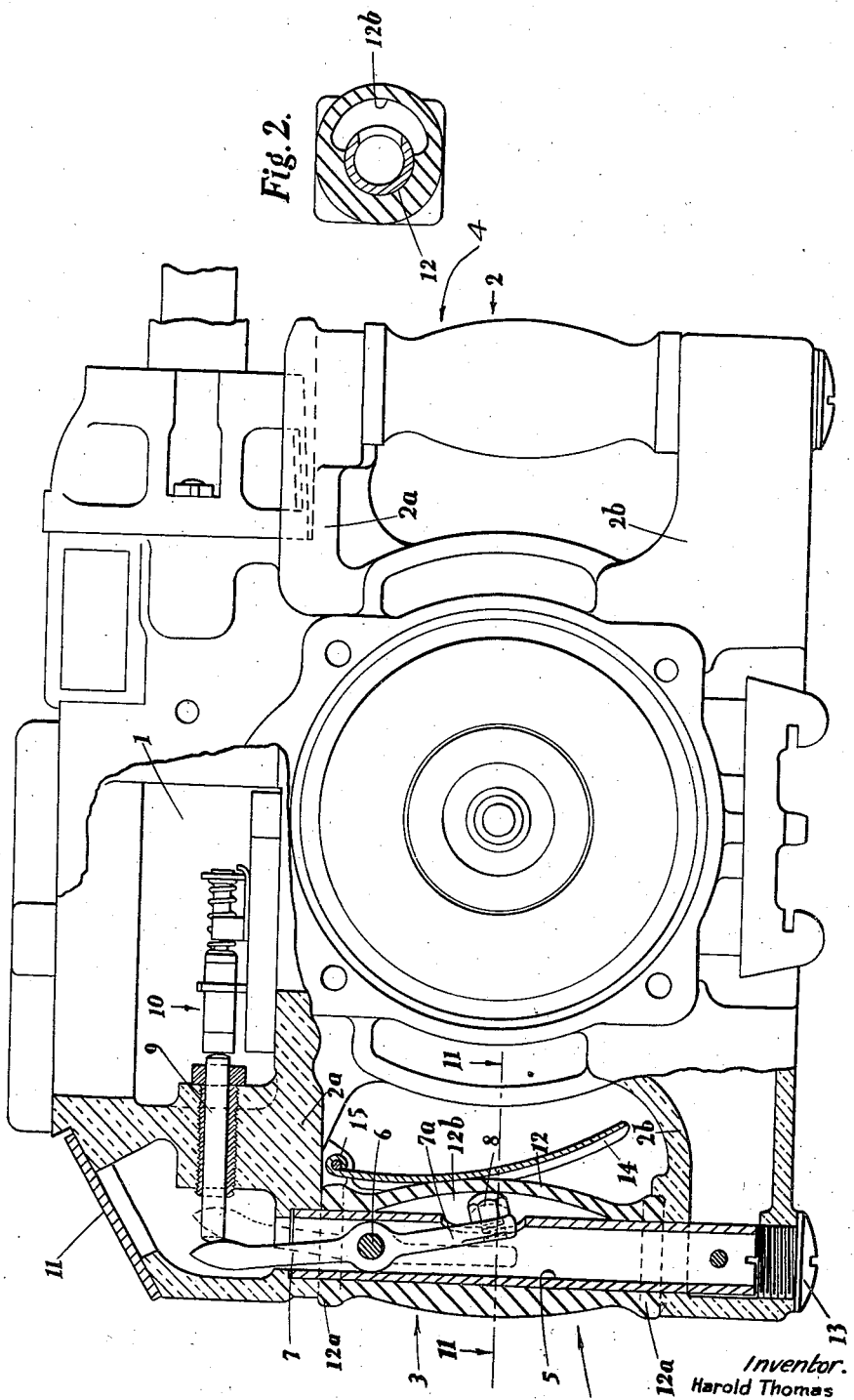
Sept. 8, 1942.     H. T. LAMB     2,295,261
DUSTPROOF SWITCH
Filed Aug. 5, 1940
Inventor.
Harold Thomas Lamb.
by
Attorney.

2,295,261

UNITED STATES PATENT OFFICE 2,295,261

DUSTPROOF SWITCH

Harold Thomas Lamb,
Newcastle-on-Tyne, England

Application August 5, 1940, Serial No. 351,476
In Great Britain August 8, 1939

6 Claims. (Cl. 200—157)

This invention relates to switch operating gear for electric machinery for use in mines and other places where there is dust, for example electric coal and stone drills.

The object of the invention is to provide an improved form of switch operating gear which will be entirely enclosed from the outer atmosphere so that ingress of dust and moisture is prevented while at the same time the switch itself is more completely cut off from the surrounding atmosphere so that the risk of fire by sparking is further eliminated.

The switch operating gear according to the invention comprises a casing for housing the switch gear to be operated, a removable switch tube, one end of said switch tube opening into said casing, said switch tube having a lateral opening, a switch lever mounted in said switch tube, one arm of said lever projecting into said casing so as to be adapted to operate the switch gear, and the other lever arm projecting through the opening in said switch tube, and a flexible gas tight sleeve fitting in a gas tight manner at its ends about said switch tube, but between its ends having a portion of its inner wall spaced from said switch tube to accommodate the projecting arm of said switch lever.

The invention will now be described by way of example with reference to the accompanying drawing which shows an electric coal and stone drill comprising the usual double-handled casing.

In the said drawing:

Fig. 1 is a part sectional view through one of the drill handles.

Fig. 2 is a section on the line II—II of Fig. 1, with the switch lever omitted.

Referring more particularly to the drawing, 1 is the drill casing, while 2 are the handles which consist of upper and lower horizontal members 2a, 2b respectively projecting from the casing 1 with vertical members 3, 4 joining their outer ends. The vertical member 3 comprises a tube 5 (hereinafter referred to as the "switch tube") in which is mounted about a fulcrum pin 6 near the upper end of the said tube a lever 7, 7a in such a way that the upper lever arm 7 projects beyond the upper end of the tube 5 while the other lever arm 7a has mounted thereon a button 8 which projects through an opening in the side of the tube 5. The horizontal handle members 2a, 2b are bored and recessed to receive the switch tube 5 which is placed in position with the upper lever arm 7 passing into the handle casing 2a so as to abut against a switch operating rod 9 forming part of a known switch operating gear 10 which need not be further described here. Above the casing 2a into which the operating lever arm 7 projects there is an inspection plate 11 for inspecting the said lever arm and the end of the operating rod 9.

Before placing the switch tube 5 in position, a moulded rubber sleeve 12 is first arranged between the two horizontal handle members 2a 2b, and the switch tube 5 is passed through the said rubber sleeve and held in position by means of a screw plug 13 in the lower horizontal handle member 2b.

The rubber sleeve 12 is of elongated barrel shape with flanges 12a at each end which are accommodated in corresponding recesses on the inner faces of the horizontal handle members. The inner portion of the rubber tube is moulded to fit about the switch tube for an amount exceeding 180° as shown in Fig. 2. The remaining portion is hollowed at 12b to accommodate the projecting operating knob 8 of the switch lever. The portion of the sleeve wall adjacent the hollow is thus thinner and therefore more flexible than the rest of the sleeve. By squeezing the rubber sleeve against the knob 8 of the switch operating lever the switch operating gear is actuated.

As the rubber sleeve 12 hermetically seals the whole switch operating gear 10 from the atmosphere the usual operating gear in the casing may be of simpler design, as with the present invention it is not necessary to have these sealed from the portion of the casing containing the switch operating lever.

In order to ease the operator's hand when he is holding the switch in the closed position an external pivoted operating handle 14 is mounted at the upper end and to the inside of the rubber sleeve 12 by pivotally mounting it at 15 on the under-side of the member 2a, the handle 14 being curved longitudinally and having a segmental cross section to accommodate the sleeve 12.

What I claim as my invention and desire to secure by Letters Patent of the United States is:

1. Switch operating gear for use on electric machinery, comprising a casing for housing the switch gear to be operated, a removable switch tube, one end of said switch tube opening into said casing, said switch tube having a lateral opening, a switch lever mounted in said switch tube, one arm of said lever projecting into said casing so as to be adapted to operate the switch gear, and the other lever arm projecting through said lateral opening in said switch tube, and a flexible gas tight sleeve fitting at its ends in a gas tight manner about said switch tube, but between its ends having a portion of its inner wall spaced from said switch tube to accommodate the projecting arm of said switch lever.

2. Switch operating gear for use on electric machinery, comprising a casing for housing the switch gear to be operated, a removable switch tube, one end of said switch tube opening into said casing, said switch tube having a lateral opening, a switch lever mounted in said switch tube, one arm of said lever projecting into said casing so as to be adapted to operate the switch gear, and the other lever arm projecting through said lateral opening in said switch tube, and a flexible gas tight sleeve fitting at its ends in a gas tight manner about said switch tube, but between its ends having a portion of its inner wall shaped to fit closely about the switch tube for an amount exceeding 180°, and another portion spaced from said switch tube to accommodate the projecting arm of said switch lever.

3. Switch operating gear for use on electric machinery comprising a casing for housing the switch gear to be operated, an outer casing into which the operating member of said switch gear projects in a dust tight manner a removable switch tube, one end of said switch tube opening into said outer casing, said switch tube having a lateral opening, a lever mounted in said switch tube, one arm of said lever projecting into a said outer casing so as to be adapted to operate said switch operating member, and the other lever arm projecting through the opening in said switch tube, and a flexible gas tight sleeve fitting at its ends in a gas tight manner about said switch tube, but between its ends having a portion of its inner wall spaced from said switch tube to accommodate the projecting arm of said switch lever.

4. Switch operating gear for use on electric machinery, comprising a casing for housing the switch gear to be operated, a removable switch tube, one end of said switch tube opening into said casing, said switch tube having a lateral opening, a switch lever mounted in said switch tube, one arm of said lever projecting into said casing so as to be adapted to operate the switch gear, and the other lever arm projecting through said lateral opening in said switch tube, a flexible gas tight sleeve fitting at its ends in a gas tight manner about said switch tube, but between its ends having a portion spaced from said switch tube to accommodate the projecting arm of said switch lever, and an inspection plate for facilitating inspection of the lever and the associated portion of the switch gear, said plate being arranged in the switch casing in substantial axial alignment with the switch tube.

5. Switch operating gear for use on electric machinery, comprising a casing for housing the switch gear to be operated, a removable switch tube, one end of said switch tube opening into said casing, said switch tube having a lateral opening, a switch lever mounted in said switch tube, one arm of said lever projecting into said casing so as to be adapted to operate the switch gear, and the other lever arm projecting through said lateral opening in said switch tube, and a flexible gas tight sleeve fitting at its ends in a gas tight manner about said switch tube, but between its ends having a portion of its inner wall spaced from said switch tube to accommodate the projecting arm of said switch lever, and pivotally mounted externally and to the inner side of said sleeve an operating handle of curved cross section, said operating handle being adapted to abut laterally against and with its curved section embracing said sleeve.

6. Switch operating gear for use on electric machinery, comprising a casing for housing the switch gear to be operated, a removable switch tube, one end of said switch tube opening into said casing, said switch tube having a lateral opening, a switch lever mounted in said switch tube, one arm of said lever projecting into said casing so as to be adapted to operate the switch gear, and the other lever arm projecting through said lateral opening in said switch tube, and a flexible gas tight sleeve fitting at its ends in a gas tight manner about said switch tube, but between its ends having a portion of its inner wall spaced from said switch tube to accommodate the projecting arm of said switch lever, and pivotally mounted externally and to the inner side of said sleeve an operating handle curved longitudinally and with its convex side adapted to abut laterally against said sleeve.

HAROLD THOMAS LAMB.